United States Patent Office 2,909,458
Patented Oct. 20, 1959

2,909,458
NEW COMPOSITIONS OF MATTER

Sidney B. Richter, Chicago, Ill., assignor to Velsicol Chemical Corporation, Chicago, Ill., a corporation of Illinois No Drawing. Application July 1, 1957
Serial No. 668,898

11 Claims. (Cl. 167—30)

This invention relates to new compositions of matter. In particular, this invention relates to new thiocyanate esters containing a halogenated bicyclo (2.2.1)-heptene configuration.

It is an object of the present invention to prepare new, valuable thiocyanates.

It is also an object of the present invention to prepare new compositions possessing fungitoxic properties.

Another object of the present invention is the devising of a new method for protecting matter against undesirable fungi.

Still another object of the present invention is a new method for the control of plant pests.

Other objects of the present invention will become apparent from the ensuing description.

The new compositions of the present invention are represented by the following structural formula:

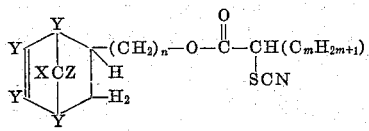

Structure I wherein X and Z are independently selected from the group consisting of hydrogen, bromine and chlorine; each Y is selected from the group consisting of bromine and chlorine; $n$ is selected from the group consisting of 0 and integers from 1 to 14; $m$ is selected from the group consisting of 0 and integers from 1 to 14.

Particularly of interest are the compounds represented by the above structure wherein each Y and X is chlorine. It can be seen that the compounds wherein $n$ is from 0–3 and $m$ from 0–3 are likewise of more practical interest.

The compositions of the present invention are unique in that they contain a halogenated bicyclo (2.2.1)-heptene configuration in addition to the thiocyanate group.

Fungus growth has proven itself to be one of the more serious problems, attacking plants, leather, and many other items of importance. The control of these organisms has proven to be a difficult thing due to the many types of fungi and the inability of known fungitoxic substances to completely control all of the known species. Consequently, there is considerable need for new and better fungicides.

Unexpectedly, applicant has found that his new, novel compounds are excellent fungicides. This is quite surprising in view of the literature which indicates that monothiocyanates (those compounds containing only one SCN group) are relatively weak fungicides. The reason for this unusual propensity of the compounds of the present invention is not clearly explainable, particularly in view of the fact that other compounds containing the halogenated bicyclo (2.2.1)-heptene configuration and which are highly valuable commercial insecticides are not especially good fungicides. Thus is appears that these fungitoxic characteristics of these new monothiocyanates can best be attributed to the novel structure of said compositions.

The new compositions of the present invention can be prepared as shown by the following equations, using the definitions of X, Y, Z, $n$ and $m$ as previously indicated:

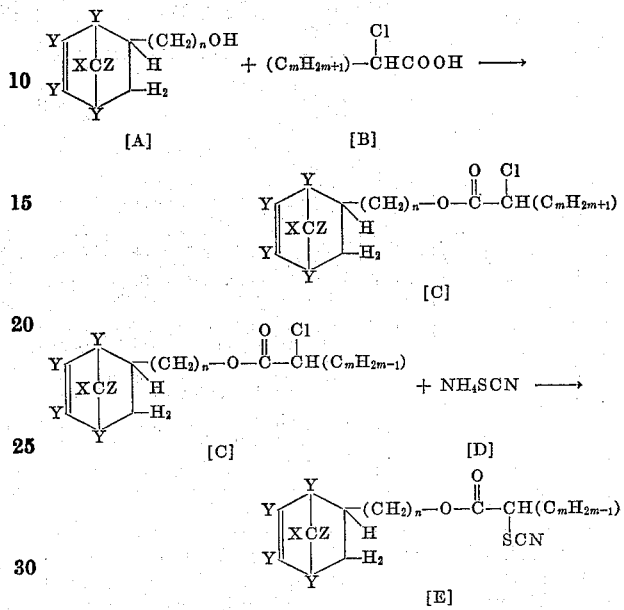

In accordance with these equations, the following table illustrates the desired thiocyanate product:

TABLE I

| Y | X | Z | $n$ | $m$ | Product |
|---|---|---|---|---|---|
| Cl | Cl | Cl | 1 | 0 | 1,2,3,4,7,7-hexachloro-5-methylthiocyanoacetate-bicyclo (2.2.1)-2-heptene. |
| Br | Br | Br | 1 | 0 | 1,2,3,4,7,7-hexabromo-5-methylthiocyanoacetate-bicyclo (2.2.1)-2-heptene. |
| Cl | H | H | 1 | 0 | 1,2,3,4-tetrabromo-5-methylthiocyanoacetate-bicyclo (2.2.1)-2-heptene. |
| Br | H | H | 1 | 0 | Do. |
| Cl | Cl | Cl | 0 | 1 | 1,2,3,4,7,7-hexachloro-5-(α-thiocyanopropionate)-bicyclo (2.2.1)-2-heptene. |
| Cl | Cl | Cl | 2 | 14 | 1,2,3,4,7,7-hexachloro-5-(2-ethyl-α-thiocyanopalmitate)-bicyclo (2.2.1)-2-heptene. |
| Cl | Cl | Cl | 14 | 3 | 1,2,3,4,7,7-hexachloro-5-(14-tetradecanyl-α-thiocyanovalerate)-bicyclo (2.2.1)-2-heptene. |
| Cl | Cl | Cl | 2 | 1 | 1,2,3,4,7,7-hexachloro-5-(2-ethyl-α-thiocyanopropionate)-bicyclo (2.2.1)-2-heptene. |
| Cl | Cl | Cl | 0 | 2 | 1,2,3,4,7,7-hexachloro-5-(α-thiocyanobutyrate)-bicyclo (2.2.1)-2-heptene. |
| Cl | Cl | Cl | 1 | 1 | 1,2,3,4,7,7-hexachloro-5-(methyl-α-thiocyanopropionate)-bicyclo (2.2.1)-2-heptene. |
| Cl | Cl | Cl | 0 | 0 | 1,2,3,4,7,7-hexachloro-5-thiocyanoacetate-bicyclo (2.2.1)-2-heptene. |
| Br | Br | Br | 9 | 12 | 1,2,3,4,7,7-hexabromo-5-(9-nonanyl-α-thiocyanomyristate)-bicyclo (2.2.1)-2-heptene. |
| Br | Br | Br | 14 | 0 | 1,2,3,4,7,7-hexabromo-5-(14-tetradecanyl-thiocyanoacetate)-bicyclo (2.2.1)-2-heptene. |
| Br | Br | Br | 0 | 2 | 1,2,3,4,7,7-hexabromo-5-(α-thiocyanobutyrate)-bicyclo (2.2.1)-2-heptene. |
| Cl | H | H | 4 | 14 | 1,2,3,4-tetrachloro-5-(4-butyl-α-thiocyanopalmitate)-bicyclo (2.2.1)-2-heptene. |
| Cl | H | H | 14 | 1 | 1,2,3,4-tetrachloro-5-(14-tetradecanyl-α-thiocyanopropionate)-bicyclo (2.2.1)-2-heptene. |
| Cl | H | H | 8 | 4 | 1,2,3,4-tetrachloro-5-(8-octyl-α-thiocyanocaproate)-bicyclo (2.2.1)-2-heptene. |
| Br | H | H | 1 | 2 | 1,2,3,4-tetrabromo-5-(methyl-α-thiocyanobutyrate)-bicyclo (2.2.1)-2-heptene. |

TABLE I—Continued

| Y | X | Z | n | m | Product |
|---|---|---|---|---|---------|
| Br | H | H | 5 | 14 | 1,2,3,4-tetrabromo - 5 - (5-pentyl-α-thiocyanopalmitate)-bicyclo (2.2.1)-2-heptene. |
| Br | H | H | 8 | 0 | 1,2,3,4-tetrabromo - 5 - (8-octyl-α-thiocyanoacetate)-bicyclo (2.2.1)-2-heptene. |
| Br | H | H | 6 | 12 | 1,2,3,4-tetrabromo - 5 - (6-hexyl-α-thiocyanomyristate)-bicyclo (2.2.1)-2-heptene. |
| Cl | Cl | H | 1 | 1 | 1,2,3,4,5-pentachloro - 5 - (methyl-α-thiocyanopropionate)-bicyclo (2.2.1)-2-heptene. |
| Cl | Cl | H | 0 | 0 | 1,2,3,4,5-pentachloro - 5 - thiocyanoacetate-bicyclo (2.2.1)-2-heptene. |
| Cl | Cl | H | 6 | 14 | 1,2,3,4,5-pentachloro - 5 - (6-hexyl - α-thiocyanopalmitate)-bicyclo (2.2.1)-2-heptene. |
| Cl | Cl | H | 1 | 2 | 1,2,3,4,5-pentachloro - 5 - (methyl - α-thiocyanobutyrate)-bicyclo (2.2.1)-2-heptene. |
| Cl | Cl | H | 5 | 2 | 1,2,3,4,5-pentachloro - 5 - (pentyl - α-thiocyanobutyrate)-bicyclo (2.2.1)-2-heptene. |
| Br | Br | H | 7 | 14 | 1,2,3,4,5-pentabromo - 5 - (heptyl - α-thiocyanopalmitate)-bicyclo (2.2.1)-2-heptene. |
| Br | Br | H | 3 | 0 | 1,2,3,4,5-pentabromo - 5 - (propyl - α-thiocyanoacetate)-bicyclo (2.2.1)-2-heptene. |
| Br | Br | H | 4 | 3 | 1,2,3,4,5-pentabromo - 5 - (butyl-α-thiocyanovalerate)-bicyclo (2.2.1) - 2 - heptene. |
| Br | Br | H | 14 | 2 | 1,2,3,4,5-pentabromo - 5 - (tetradecanyl-α-thiocyanobutyrate) - bicyclo (2.2.1)-2-heptene. |
| Br | Br | H | 1 | 1 | 1,2,3,4,5-pentabromo - 5 - (methyl - α-thiocyanopropionate)-bicyclo (2.2.1)-2-heptene. |

The following examples describe in detail the preparation of these new compositions. These examples utilize the previously shown reaction; however, the mode of preparation is not critical and other methods may be used to prepare the compositions of the present invention.

The starting material for this two-step process, indicated as [A], is preparable by the Diels-Alder adduction of tetra-, penta-, or hexahalocyclopentadiene and α-monoolefinic ω-monohydroxyalcohols containing from 3–16 carbon atoms at a temperature between about 100° C. and 180° C. Since vinyl alcohol is not stable when it is desired that n in the equations be 0, it is necessary to adduct with vinyl acetate and hydrolyze the adduct to prepare the present compositions wherein n is 0. The following alcohols are included:

Allyl alcohol
Propenol-2
1-butene-4-ol
1-pentene-5-ol
1-hexene-6-ol
1-heptene-7-ol
1-octene-8-ol
1-nonene-9-ol
1-decene-10-ol
1-undecene-11-ol
1-dodecene-12-ol
1-tridecene-13-ol
1-tetradecene-14-ol In accordance with this process for the preparation of the present composition, the above indicated Diels-Alder adducts of hexachlorocyclopentadiene and α-monoolefinic-ω-monoalcohols are reacted with one of the following α-chloroacids:

α-Monochloropropionic acid
α-Monochlorobutyric acid
α-Monochlorovaleric acid
α-Monochlorocaproic acid
α-Monochlorooenanthic acid
α-Monochlorocaprylic acid
α-Monochloropelargonic acid
α-Monochlorocapric acid
α-Monochloroundecoic acid
α-Monochlorolauric acid
α-Monochlorotridecoic acid
α-Monochloromyristic acid
α-Monochloropentadecoic acid
α-Monochloropalmitic acid This reaction which results in the intermediate denoted as [C] in the previous reaction equations can be performed using benzene or toluene as solvent, at atmospheric pressure as a continuous or batch process, at temperatures between about 50° C. and 150° C., with satisfactory yields obtainable in from about 1 to 10 hours of reaction, the product recoverable by distillation of said mixture.

The final step in this process for the preparation of the present invention is the reaction of the chloride [C] in the reaction equations, with ammonium thiocyanate, a reaction which yields the new thiocyanate ester of the present invention. This reaction is conveniently performed with alcohol as the solvent, under atmospheric pressure at from about 50–150° C. for about 1 to 20 hours. The product is recovered by distillation of the reaction mixture.

The following examples describe this preparation of the present compositions of matter.

Example I

PREPARATION OF 1,2,3,4,7,7-HEXACHLORO-5-METHYL-HYDROXY-BICYCLO (2.2.1)-2-HEPTENE

Hexachlorocyclopentadiene (136.4 grams; 0.5 mol) was placed in a three-necked glass reaction vessel equipped with stirrer, thermometer, addition funnel, reflux condenser and heated to about 160° C. Allyl alcohol (348 grams; 0.6 mol) was added dropwise from the addition funnel over a five-hour period, maintaining a temperature between about 155–165° C. The solution was cooled, added to pentane (500 mL), and the resulting product obtained by filtration was recrystallized from hexane, yielding 101 grams of product having a M.P. of 162.0–162.5° C. The product was analyzed for C, H and Cl.

|  | C | H | Cl |
|---|---|---|---|
| Theoretical | 29.04 | 1.83 | 64.30 |
| Found | 29.05 | 1.81 | 64.46 |

Example II

PREPARATION OF 1,2,3,4,7,7-HEXACHLORO-5-METHYL-CHLORO-ACETATE-BICYCLO (2.2.1)-2-HEPTENE 1,2,3,4,7,7-hexachloro-5-methylhydroxy-bicyclo (2.2.1)-2-heptene (99.2 grams; 0.3 mol) was placed in a three-necked glass reaction flask equipped with stirrer, thermometer, Dean-Starke tube and reflux condenser and containing toluene (200 ml.), chloroacetic acid (28.4 grams; 0.3 mol) and p-toluene sulfonic acid (1 gram). The solution was refluxed for 5 hours, then cooled to room temperature, washed with bicarbonate, and dried over calcium chloride. The solvent was removed under reduced pressure and the product recovered by distillation as the fraction with boiling point of 139–140° C. at 0.15 mm. Hg pressure and a refractive index at 24° C. of 1.5487. An elemental analysis for $C_{10}H_7Cl_7O_2$ was—

|  | C | H | Cl |
|---|---|---|---|
| Theoretical | 29.49 | 1.72 | 60.94 |
| Found | 29.70 | 1.71 | 60.98 |

Example III

PREPARATION OF 1,2,3,4,7,7-HEXACHLORO-5-METHYL-THIOCYANO-ACETATE BICYCLO (2.2.1)-2-HEPTENE 1,2,3,4,7,7-hexachloroacetate bicyclo (2.2.1)-2-heptene (93 grams; 0.23 mol) was placed in a three-necked glass reaction vessel equipped with stirrer, thermometer and reflux condenser and containing ethyl alcohol (500 ml.), ammonium thiocyanoacetate (19 grams; 0.25 mol) was added and the solution refluxed with stirring for 16 hours. At the end of the 16-hour period, the solution was cooled to room temperature, filtered, and the solvent removed under reduced pressure. The desired product was obtained by molecular distillation of the reaction mixture at 0.2 mm. Hg pressure and temperatures of 145–155° C. Its refractive index at 24° C. was 1.5641 and it was analyzed for $C_{11}H_7Cl_6O_2SN$:

|  | C | H | Cl |
|---|---|---|---|
| Theoretical | 30.73 | 1.63 | 49.48 |
| Found | 30.43 | 1.86 | 49.81 |

Its structure is:

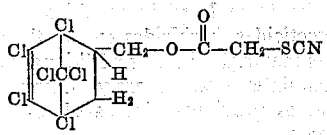

Example IV

PREPARATION OF 1,2,3,4,7,7-HEXACHLORO-5-(METHYL-α-CHLOROPROPIONATE)-BICYCLO (2.2.1)-2-HEPTENE

Product of Example I (99.2 grams; 0.3 mol) is placed in a three-necked glass reaction flask equipped with stirrer, thermometer, and reflux condenser and containing toluene (200 ml.), α-chloropropionic acid (32.6 grams; 0.3 mol) and p-toluene sulfonic acid (1 gram). The solution is refluxed for 5 hours, cooled to room temperature, washed with bicarbonate, and dried over calcium chloride. The solvent is removed under reduced pressure and the desired compound is recovered by distillation.

Example V

PREPARATION OF 1,2,3,4,7,7-HEXACHLORO-5-(METHYL-α-THIOCYANOPROPIONATE)-BICYCLO (2.2.1)-2-HEPTENE 1,2,3,4,7,7 - hexachloro - 5 - (methyl - α - chloropropionate)-bicyclo (2.2.1)-2-propionate (96.7 grams; 0.23 mol) is placed in a three-necked glass reaction vessel equipped with stirrer, thermometer and reflux condenser and containing ethyl alcohol (500 ml.). Ammonium thiocyanoacetate (19 grams; 0.25 mol) was added and the solution refluxed with stirring for 16 hours. At the end of the 16-hour period, the solution was cooled to room temperature, filtered, and the solvent removed under reduced pressure. The desired product is obtained by molecular distillation of the reaction mixture and its structure is:

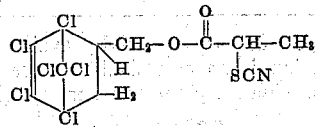

Example VI

PREPARATION OF 1,2,3,4,7,7-HEXACHLORO-5-HYDROXY-BICYCLO (2.2.1)-2-HEPTENE

This composition usable as an intermediate in the preparation of the compositions of the present invention is equivalent to the Diels-Alder adduct of hexachlorocyclopentadiene and vinyl alcohol. Since vinyl alcohol is not stable, the following two-step process is used.

Hexachlorocyclopentadiene (163.4 grams; 0.6 mol) was placed in a glass reaction vessel equipped with stirrer, thermometer, reflux condenser and sparger. The hexachlorocyclopentadiene was placed in a reaction vessel equipped with stirrer, thermometer, reflux condenser and sparger. The hexachlorocyclopentadiene was heated to 180° C. and vinyl acetate (51.7 grams; 0.6 mol) was added through the sparger below the surface of the heated hexachlorocyclopentadiene over a four-hour addition period. The reaction mixture was maintained at about 180° C. for an additional hour after completion of the addition. Then unreacted hexachlorocyclopentadiene was removed by steam distillation and the product recovered by recrystallization from hexane. Its melting point was 44.5–46.0° C.

The above prepared Diels-Alder adduct of hexachlorocyclopentadiene and vinyl acetate (108.3 grams; 0.3 mol) was placed in a reaction vessel equipped with stirrer, thermometer and reflux condenser and containing methanol (64 grams; 2.0 mol) and hydrochloric acid (73.0 grams; 2.0 mol). The mixture was held for 2 hours at 120° C. The product recovered by filtration has a melting point of 152.0–152.5° C.

Example VII

PREPARATION OF 1,2,3,4,7,7-HEXACHLORO-5-(α-CHLOROPROPIONATE)-BICYCLO (2.2.1)-2-HEPTENE 1,2,3,4,7,7-hexachloro-5-hydroxy-bicyclo (2.2.1)-2-heptene (98.1 grams; 0.3 mol) is placed in a glass reaction vessel equipped with stirrer, thermometer, Dean-Starke tube, and reflux condenser and containing toluene (200 ml.) α-chloropropionic acid (28.4 grams; 0.3 mol) and p-toluene sulphonic acid (1 gram). The solution is refluxed for 5 hours, then cooled to room temperature, washed with bicarbonate, and dried over calcium chloride. The solvent is removed under reduced pressure and the desired product recovered by distillation.

Example VIII

PREPARATION OF 1,2,3,4,7,7-HEXACHLORO-5-(α-THIOCYANOPROPIONATE)-BICYCLO (2.2.1)-2-HEPTENE 1,2,3,4,7,7 - hexachloro - 5 - (α - chlorocyanopropionate)-bicyclo (2.2.1)-2-heptene (94.0 grams; 0.23 mol) is placed in a three-necked glass reaction flask equipped with stirrer, thermometer and reflux condenser, and containing ethyl alcohol (500 ml.). Ammonium thiocyanate (19 grams; 0.25 mol) is added and the solution refluxed with stirring for 16 hours. At the end of the 16-hour reaction period, the reaction mixture is cooled to room temperature, filtered, and the solvent removed under reduced pressure. The desired product is obtained by molecular distillation and has the following structural formula:

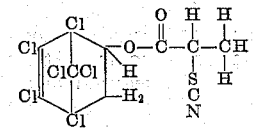

Example IX

PREPARATION OF 1,2,3,4,7,7-HEXACHLORO-5-(α-CHLOROACETATE)-BICYCLO (2.2.1)-2-HEPTENE 1,2,3,4,7,7-hexachloro-5-hydroxy-bicyclo (2.2.1)-2-heptene (98.1 grams; 0.3 mol) is placed in a glass reaction vessel equipped with stirrer, thermometer, Dean-Starke tube and reflux condenser and containing toluene (200 ml.), chloroacetic acid (28.4 grams; 0.3 mol) and p-toluene sulfonic acid (1 gram). The solution is refluxed for 5 hours, then cooled to room temperature, washed with bicarbonate, and dried over calcium chloride. The solvent is removed under reduced pressure and the desired product recovered by distillation.

Example X

PREPARATION OF 1,2,3,4,7,7-HEXACHLORO-5-(THIOCYANOACETATE)-BICYCLO (2.2.1)-2-HEPTENE 1,2,3,4,7,7 - hexachloro - 5 - α - chloroacetate-bicyclo (2.2.1)-2-heptene (90.5 grams; 0.23 mol) is placed in a three-necked glass reaction vessel equipped with stirrer, thermometer and reflux condenser and containing ethyl alcohol (500 ml.). Ammonium thiocyanate (19 grams; 0.25 mol) is added and the solution refluxed with stirring for 16 hours. At the end of the 16-hour reaction period, the reaction mixture is cooled to room temperature, filtered, and the solvent removed under reduced pressure. The desired product is obtained by molecular distillation and has the following structural formula:

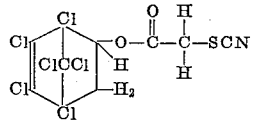

Example XI

PREPARATION OF 1,2,3,4,7,7-HEXACHLORO-5-(HEPTYL-6-OL)-BICYCLO (2.2.1)-2-HEPTENE

Hexachlorocyclopentadiene (136.4 grams; 0.5 mol) is placed in a three-necked glass reaction vessel equipped with stirrer, thermometer, addition funnel and reflux condenser and heated to about 160° C. 1-octene-8-ol (76.8 grams; 0.6 mol) is added dropwise from the addition funnel over a five-hour period, maintaining the temperature at about 160° C. The solution is cooled, added to pentane (500 ml.) and the desired product obtained by filtration.

Example XII

PREPARATION OF 1,2,3,4,7,7-HEXACHLORO-5-(HEPTYL-α-CHLOROCAPRYLATE)-BICYCLO (2.2.1)-2-HEPTENE 1,2,3,4,7,7 - hexachloro - 5 - (heptyl - 6 - ol) - bicyclo (2.2.1)-2-heptene (120.3 grams; 0.3 mol) is placed in a three-necked glass reaction vessel equipped with stirrer, thermometer, Dean-Starke tube and reflux condenser and containing toluene (200 ml.), α-chlorocapyrlic acid (53.6 grams; 0.3 mol) and p-toluene sulphonic acid (1 gram). The solution is refluxed for five hours, then cooled to room temperature, washed with bicarbonate and dried over calcium chloride. The solvent is removed under reduced pressure and the product recovered by distillation.

Example XIII

PREPARATION OF 1,2,3,4,7,7-HEXACHLORO-5-(HEPTYL-α-THIOCYANOCAPRYLATE)-BICYCLO (2.2.1)-2-HEPTENE 1,2,3,4,7,7 - hexachloro - 5 - (heptyl - α - chlorocaprylate)-bicyclo (2.2.1)-2-heptene (129.1 grams; 0.23 mol) is placed in a three-necked glass reaction vessel equipped with stirrer, thermometer and reflux condenser and containing ethyl alcohol (500 ml.). Ammonium thiocyanate (19 grams; 0.25 mol) is added and the solution refluxed with stirring for 16 hours. At the end of the 16-hour reaction period, the reaction mixture is cooled to room temperature, filtered, and the solvent removed under reduced pressure. The desired product is obtained by molecular distillation and has the following structural formula:

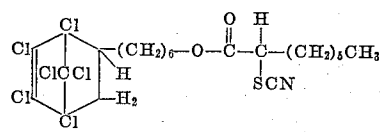

As previously indicated, the present compositions of matter have superior fungus toxicity, making them quite valuable in the protection of numerous items, such as plant life, leather and other matter susceptible to attack by various fungi.

Indicative of this valuable property of these new, unique compounds is the following fungicidal test using the glass slide spore germination method:

Example XIV

A measured concentration of spores of *Schlerotinia fructicola* was placed on glass slides in contact with the stated concentration of 1,2,3,4,7,7-hexachloro-5-methyl-thiocyanoacetate-bicyclo (2.2.1)-2-heptene prepared by dissolving said test compound in acetone and dispersing the solution in water. The percent germination of the spores was then determined after 24 hours' incubation at 72° F. At a concentration of 100 p.p.m. the percent germination was found to be 1%. At a concentration of 10 p.p.m. the percent germination was 38%. Thus, the ED$_{50}$ value for said test compound is less than 10 p.p.m.

These compositions can be used by means known to the art for the application of fungicides and other like materials. Thus, they can be dissolved in a suitable solvent, such as toluene, and sprayed onto the material or land to be protected; or they can be formulated with an inert carrier material, ground to a desired particle size, and dusted onto the area; or they can be formulated into emulsifiable concentrates, dispersed in water, and the material to be protected dipped therein. Likewise, other ingredients, such as stickers, wetting agents, dispersing agents, and the like, can be formulated therewith. If desired, these compositions can be incorporated into waxes, etc. and may be formulated in combination with other fungicides, insecticides, herbicides so that the user thereof can provide his material with this additional benefit. The following formulations are merely illustrative, and of course do not, as previously indicated, exclude various other ingredients.

Example XV

Percent by weight
Product of Example VIII _____ 50
Celite 209 _____ 50

Celite 209 is a diatomaceous earth utilized as a relatively inert carrier. The composition represented here is a 50% dust or granular, depending on the degree of grinding, if any, performed on the formulation, and is applied by dusting, spreading, etc., to control such plant diseases as *Phytophthora infestans* and *Alternaria solani*.

Example XVI

Percent by weight
Product of Example X _____ 70
Micro-Cel 800 _____ 27
Triton X-100 _____ 3

Micro-Cel 800 is a synthetic, relatively inert, porous carrier material consisting substantially of calcium silicate. Triton X-100 is a wetting agent, chemically an alkyl aryl polyether alcohol. This formulation is a wettable powder suitable for "slurry" treatment of seeds and other like matter to protect against such plant diseases as *Ustilago hordei*, *Ustilago nuda*, and other varieties of smut.

Example XVII

Percent by weight
Product of Example XIII _____ 60
Isopropyl acetate _____ 23
Isopropyl alcohol _____ 10
Atlas G-1690 _____ 7

Atlas G-1690 is a commercially available emulsifier. This formulation is an emulsifiable concentrate readily usable for spraying the plant or other material to be protected against such diseases as *venturia inaequalis* (apple scab), leaf spots, cereal and apply rusts and other fungi.

In addition to the above indicated utility of the present compositions, they are likewise valuable as intermediates in the preparation of many valuable compounds. Thus, for example, they can be reacted with thio acids to form esters of the thio acid; with chlorine to form chlorosulfones and other like general reactions of thiocyanates.

I claim:
1.

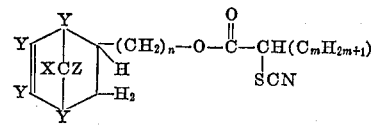

wherein X and Z are independently selected from the group consisting of hydrogen, chlorine and bromine;

each Y is selected from the group consisting of bromine and chlorine; *m* and *n* are each selected from the group consisting of 0 and integers from 1 to 14.

2.

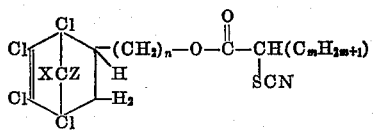

wherein X and Z are independently selected from the group consisting of hydrogen and chlorine; *m* and *n* are each selected from the group consisting of 0 and integers from 1 to 14.

3.

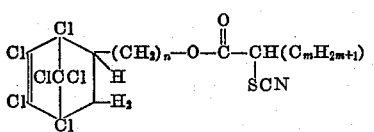

wherein *m* and *n* are each selected from the group consisting of 0 and integers from 1 to 14.

4.

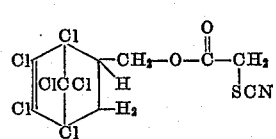

5.

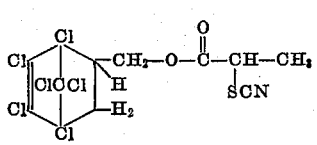

6.

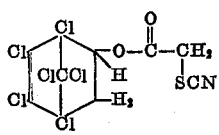

7.

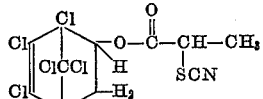

8.

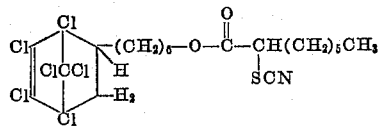

9. The method for the control of undesirable fungus growth which comprises applying to the material being protected an effective quantity of the composition of claim 1.

10. The method for the protection of material from fungus which comprises contacting said material with an effective quantity of the composition of claim 1.

11. The process for the control of fungus which comprises the application of an effective amount of the composition of claim 1 to their environment.

References Cited in the file of this patent
UNITED STATES PATENTS

| | | |
|---|---|---|
| 2,217,613 | Borglin | Oct. 8, 1940 |
| 2,217,614 | Borglin | Oct. 8, 1940 |
| 2,616,825 | Gilbert | Nov. 4, 1952 |
| 2,638,431 | Harry | May 12, 1953 |
| 2,650,240 | Olin | Aug. 25, 1953 |
| 2,744,924 | Herzfeld | May 8, 1956 |

UNITED STATES PATENT OFFICE
CERTIFICATE OF CORRECTION

October 20, 1959

Patent No. 2,909,458

Sidney B. Richter

It is hereby certified that error appears in the printed specification of the above numbered patent requiring correction and that the said Letters Patent should read as corrected below.

Column 2, line 44, in Table I, sixth column thereof, for "-tetrabromo-" read -- -tetrachloro- --; line 45, same Table I, same sixth column thereof, for "do." read -- 1,2,3,4-tetrabromo-5-methylthiocyanoacetate-bicyclo(2.2.1)-2-heptene. --; column 3, line 13, in Table I—Continued, sixth column thereof, for "-biccylo" read -- -bicyclo --.

Signed and sealed this 26th day of April 1960.

(SEAL)
Attest:

KARL H. AXLINE
Attesting Officer

ROBERT C. WATSON
Commissioner of Patents